US010813027B2

(12) United States Patent
Jactat

(10) Patent No.: US 10,813,027 B2
(45) Date of Patent: Oct. 20, 2020

(54) SYSTEMS AND METHODS FOR REPORTING DATA RECEPTION STATUS

(71) Applicant: JRD COMMUNICATION INC., Guangdong (CN)

(72) Inventor: Caroline Jactat, Guangdong (CN)

(73) Assignee: JRD COMMUNICATION INC., Guangdong (CN)

( * ) Notice: Subject to any disclaimer, the term of this patent is extended or adjusted under 35 U.S.C. 154(b) by 0 days.

(21) Appl. No.: 15/526,733

(22) PCT Filed: Sep. 21, 2016

(86) PCT No.: PCT/CN2016/099527
§ 371 (c)(1),
(2) Date: May 12, 2017

(87) PCT Pub. No.: WO2017/050222
PCT Pub. Date: Mar. 30, 2017

(65) Prior Publication Data
US 2018/0206167 A1 Jul. 19, 2018

(30) Foreign Application Priority Data
Sep. 25, 2015 (GB) .................................. 1517040.0

(51) Int. Cl.
*H04W 36/22* (2009.01)
*H04W 88/06* (2009.01)
*H04L 1/00* (2006.01)
(Continued)

(52) U.S. Cl.
CPC ............... *H04W 36/22* (2013.01); *H04L 1/00* (2013.01); *H04L 1/1621* (2013.01);
(Continued)

(58) Field of Classification Search
None
See application file for complete search history.

(56) References Cited

U.S. PATENT DOCUMENTS

| 2014/0254393 A1 | 9/2014 | Yi et al. |
| 2015/0117357 A1 | 4/2015 | Ozturk et al. |

(Continued)

FOREIGN PATENT DOCUMENTS

| CN | 104735728 A | 6/2015 |
| WO | 2015/059055 A2 | 4/2015 |

(Continued)

OTHER PUBLICATIONS

Extended European Search Report in European Patent Application No. 16848103.4, dated Dec. 1, 2017.
International Search Report issued in International Patent Application No. PCT/CN2016/099527 dated Dec. 8, 2016.
UKIPO Search Report in Great Britain Patent Application No. 1517040.0 dated Feb. 26, 2016.

*Primary Examiner* — Chi H Pham
*Assistant Examiner* — Raul Rivas
(74) *Attorney, Agent, or Firm* — Baker & Hostetler LLP

(57) ABSTRACT

A method performed by a User Equipment that includes a first wireless interface for establishing a communication link with an eNodeB of an LTE Radio Access Network, and a second wireless interface for establishing a communication link with a Wi-Fi Access Point. The method includes receiving, by the User Equipment Packet Data Units, PDUs, encoded using the Packet Data Convergence Protocol, PDCP, via the second wireless interface; deriving, by the User Equipment, PDCP SDU sequence numbers from the successfully received PDCP PDUs; and sending, by the User Equipment in response to an event, a PDCP Status Report derived at least in part from the sequence numbers of the successfully received PDCP PDUs.

15 Claims, 4 Drawing Sheets

(51) Int. Cl.
  *H04L 1/16*  (2006.01)
  *H04W 76/15* (2018.01)
  *H04W 28/04* (2009.01)
  *H04W 28/08* (2009.01)
  *H04W 36/00* (2009.01)
  *H04W 76/16* (2018.01)

(52) U.S. Cl.
  CPC ........... *H04L 1/1685* (2013.01); *H04W 28/04* (2013.01); *H04W 28/08* (2013.01); *H04W 36/0022* (2013.01); *H04W 76/15* (2018.02); *H04W 88/06* (2013.01); *H04L 1/1628* (2013.01); *H04W 76/16* (2018.02)

(56) References Cited

U.S. PATENT DOCUMENTS

2015/0146617 A1   5/2015  Park et al.
2016/0212661 A1*  7/2016  Basu Mallick ....... H04L 1/1614
2016/0255488 A1*  9/2016  Mestanov ............... H04L 67/24
                                                            370/254

FOREIGN PATENT DOCUMENTS

WO   2016/070921 A1   5/2016
WO   2017/030420 A1   2/2017

\* cited by examiner

SYSTEMS AND METHODS FOR REPORTING DATA RECEPTION STATUS

CROSS-REFERENCE TO RELATED APPLICATIONS

This application is a National Stage of International patent application PCT/CN2016/099527, filed on Sep. 21, 2016, which claims priority to foreign Great Britain patent application No. 1517040.0, filed on Sep. 25, 2015, the disclosures of which are incorporated by reference in their entirety.

TECHNICAL FIELD

Embodiments of the present invention generally relate to systems and methods for use in telecommunication networks. More specifically, they relate to systems and methods that facilitate reporting of data reception status.

BACKGROUND

Wi-Fi, also known as Wireless Local Access Network (WLAN), is a wireless data communication and networking technology, specified by the Institute of Electrical and Electronics Engineers (IEEE) 802.11 family of standards which define the physical layer (PHY) and medium access control (MAC) layer of the Open Systems Interconnection model (OSI Model).

Wi-Fi provides low cost usage of the radio spectrum allocated to it. Wi-Fi uses the Industrial, Scientific and Medical (ISM) radio band, which is a portion of radio spectrum reserved internationally for use for industrial, scientific and medical purposes other than telecommunications. Hence any equipment using the IEEE 802.11 family of standards does not need to pay for the usage of the spectrum to any authority anywhere in the world.

The 3rd Generation Partnership Project (3GPP) and cellular operators have been able to integrate Wi-Fi into Long-Term Evolution (LTE) networks. This allows the cellular operators to provide better services to users located within indoor premises where cellular coverage is typically poorer (e.g. homes, offices, shopping malls, etc.) where Wi-Fi is usually deployed. Wi-Fi can complement cellular radio networks by providing data services in areas of poor cellular reception. Wi-Fi can complement cellular radio networks by providing enhanced data throughput.

According to 3GPP LTE Release 12, a functionality called LTE WLAN interworking has been introduced that allows a Wi-Fi Access Point (AP) to connect to the LTE Core Network. The LTE core network operators can thus enable cellular network operators to offload a part of their cellular network traffic to a Wi-Fi AP. With this functionality, an LTE Radio Access Network (RAN) may control a set of Wi-Fi APs whose broadcast identifiers are provided to user devices on an LTE radio interface. A User Equipment (UE) may report Wi-Fi signal measurements at the UE for those APs so that the LTE RAN can request the Core Network to offload traffic by steering the traffic bearer(s) for the UE towards a Wi-Fi AP depending on the quality of Wi-Fi signals at the UE.

According to 3GPP Release 13, the LTE Radio Access Network (instead of the Core Network) may also itself control the offloading and allocation of the most suitable radio access technology to all or some of the data streams in an Internet Protocol (IP) application layer. This functionality is called LTE WLAN Aggregation (LWA).

Out of the context of LWA, i.e. when an LTE network does not employ Wi-Fi functionality, a UE may report a status of the reception of data via the LTE network by the user device. Packet Data Convergence Protocol (PDCP) is used for transferring IP application layer data within LTE networks in the form of PDCP Service Data Units (SDUs) which are converted into corresponding Packet Data Units (PDUs) by a PDCP entity of an eNodeB. While receiving data from a LTE network, a configured UE provides the network with a PDCP Status Report including the reception status of PDCP PDUs received from the LTE network. Based on this report, the LTE network can recognise the PDCP PDUs that have been sent to but have failed to be received by the UE and can retransmit the failed-to-be-received PDCP PDUs to the UE, thereby providing better service quality and user experience.

According to the 3GPP TS 36.323 Evolved Universal Terrestrial Radio Access (E-UTRA) Packet Data Convergence Protocol (PDCP) specification, such status reports are only sent where there could be data transfer interruptions such as a handover from one serving LTE radio cell to another cell.

There is a need to provide status reporting in the LWA system. The embodiments of the present invention provide improved techniques for reporting data reception status by a UE in relation to an LWA system.

The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention, there is provided A method performed by a User Equipment having a first wireless interface for establishing a communication link with an eNodeB of an LTE Radio Access Network, and a second wireless interface for establishing a communication link with a Wi-Fi Access Point, the method comprising the steps of receiving, by the User Equipment Packet Data Units, PDUs, encoded using the Packet Data Convergence Protocol, PDCP, via the second wireless interface; deriving, by the User Equipment, PDCP sequence numbers from the successfully received PDCP PDUs; from the derived PDCP sequence numbers deriving, by the User Equipment, missing PDCP sequence numbers and the number of missing PDCP sequence numbers, and sending, by the User Equipment in response to an event, a PDCP Status Report derived at least in part from the sequence numbers of the successfully received PDCP PDUs.

In one embodiment, said PDCP Status Report comprises the PDCP sequence numbers associated with the successfully received PDCP PDUs.

In one embodiment, said deriving PDCP sequence numbers comprises deriving the PDCP sequence numbers corresponding to PDCP PDUs which are missing from the PDCP PDUs successfully received by the UE; wherein said PDCP Status Report comprises the PDCP sequence numbers corresponding to the PDCP PDUs which are missing from the PDCP PDUs successfully received by the UE.

In one embodiment, the method further comprises determining, by the UE, a ratio of the number of PDCP sequence numbers which are missing to a total number of PDCP PDUs expected by the UE.

In one embodiment, the method further comprises determining by the UE, a throughput of the PDCP PDUs, which is a ratio of a number of successfully received PDCP PDUs to a total number of PDCP PDUs expected by the UE.

In one embodiment, the event is receiving, by the UE, a request for a PDCP status report.

In one embodiment, the event is that said number of the PDCP sequence numbers which are missing exceeds a pre-defined threshold.

In one embodiment, the event is that said ratio exceeds a pre-defined threshold.

In one embodiment, the event is that said throughput falls below a pre-defined threshold.

In one embodiment, the method further comprises receiving, by the eNodeB from the UE, the PDCP status report; deducing, by the eNodeB from the PDCP status report, the PDCP PDUs which have been transmitted to the UE but have failed to be received by the UE, and re-transmitting, by the eNodeB to the UE, the PDCP units that have failed to be received by the UE.

In one embodiment, the method further comprises offloading, by the eNodeB, to the Wi-Fi Access Point, data to be sent to the UE.

In one embodiment, the method further comprises determining, by a LTE network, an amount of data traffic to be offloaded to the Wi-Fi AP based on the PDCP Status Report.

According to a second aspect of the present invention, there is provided a method, for use by a UE having a first wireless interface for establishing a communication link via a first radio access technology, and a second wireless interface for establishing a communication link via a second radio access technology, the method comprising: receiving, by a UE, data via the second wireless interface; deriving, by a UE, information from the data received; and sending, by a UE, in response to an event, said information to the network, which is configured to determine an amount of data to be offloaded for transmission via the second radio technology based on the information.

According to a third aspect of the present invention, there is provided a method, performed a network configured to send data via a first radio access technology to a UE, and to send data via a second radio access technology to the UE, the method comprising: sending, by network to a UE, data via the second radio access technology; receiving, by the network, information derived by the UE from the data sent, determining by the network, an amount of data to be offloaded for transmission to the UE via the second radio technology based on the information.

In one embodiment, the information comprises PDCP sequence numbers.

In one embodiment, the first radio access technology is LTE and the second radio technology is Wi-Fi.

According to a forth aspect of the present invention, there is provided a method for use by a Wi-Fi Access Point having a wireless interface for establishing a communication link with an eNodeB of an LTE Radio Access Network, the method comprising the steps of receiving, by the Wi-Fi Access Point, Packet Data Units, PDUs, encoded using the Packet Data Convergence Protocol, PDCP, via the wireless interface; deriving, by the Wi-Fi Access Point, PDCP sequence numbers from the successfully received PDCP PDUs; and sending, by the Wi-Fi Access Point to the eNodeB in response to an event, a PDCP Status Report derived at least in part from the sequence numbers of the successfully received PDCP PDUs.

Said PDCP Status Report may comprise the PDCP sequence numbers missing from the derived sequence numbers of the successfully received PDCP PDUs.

In one embodiment, each of the PDCP PDUs corresponds to a PDCP SDU and an associated PDCP SDU sequence number.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Within the context of LWA, two scenarios exist depending on how the WLAN access point is connected to the LTE base station (commonly known as an eNodeB in the LTE standards).

In a first system, an eNodeB supporting LWA is connected to the WLAN via an ideal/internal backhaul in the collocated deployment scenario. In a second system the eNodeB is connected to the WLAN by a non-ideal backhaul in the non-collocated deployment scenario. The non-ideal backhaul has higher latency and more limited capacity than the ideal backhaul which may be fiber based access. 3GPP TR 36.932 permits up to 60 ms backhaul delay for non-ideal backhaul connections.

Figure 1A:
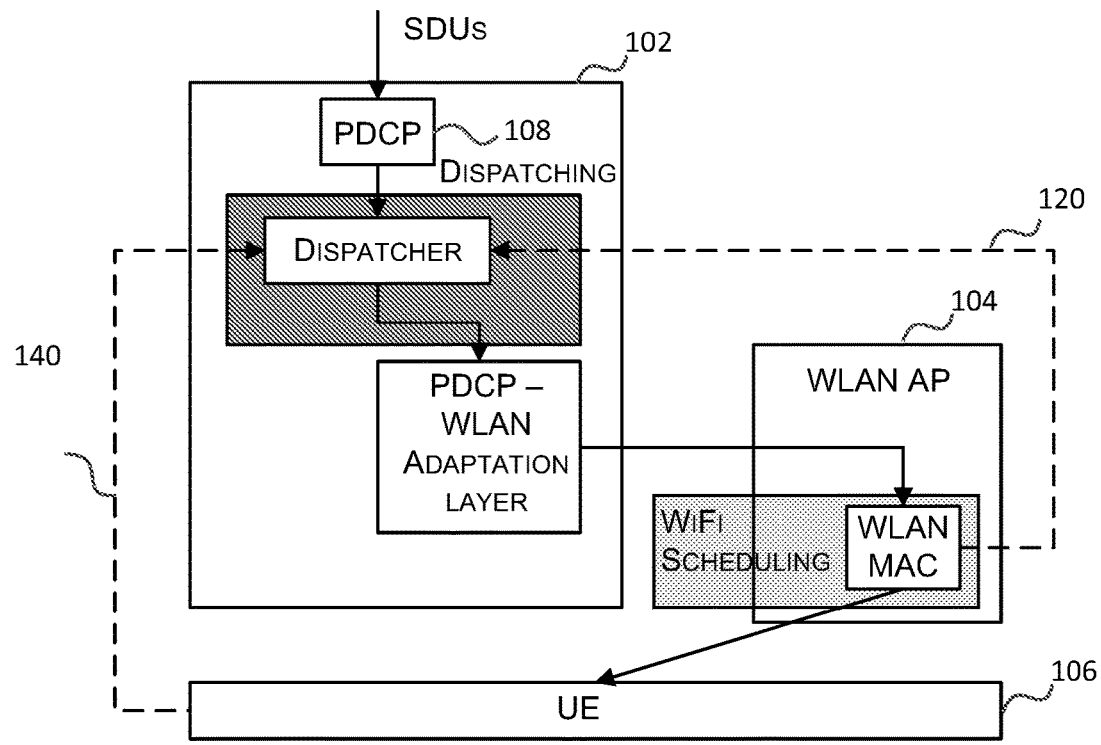
FIG. 1a is a schematic diagram showing a bearer switch mechanism for offloading between LTE radio access and WLAN radio access.
Figure 1B:
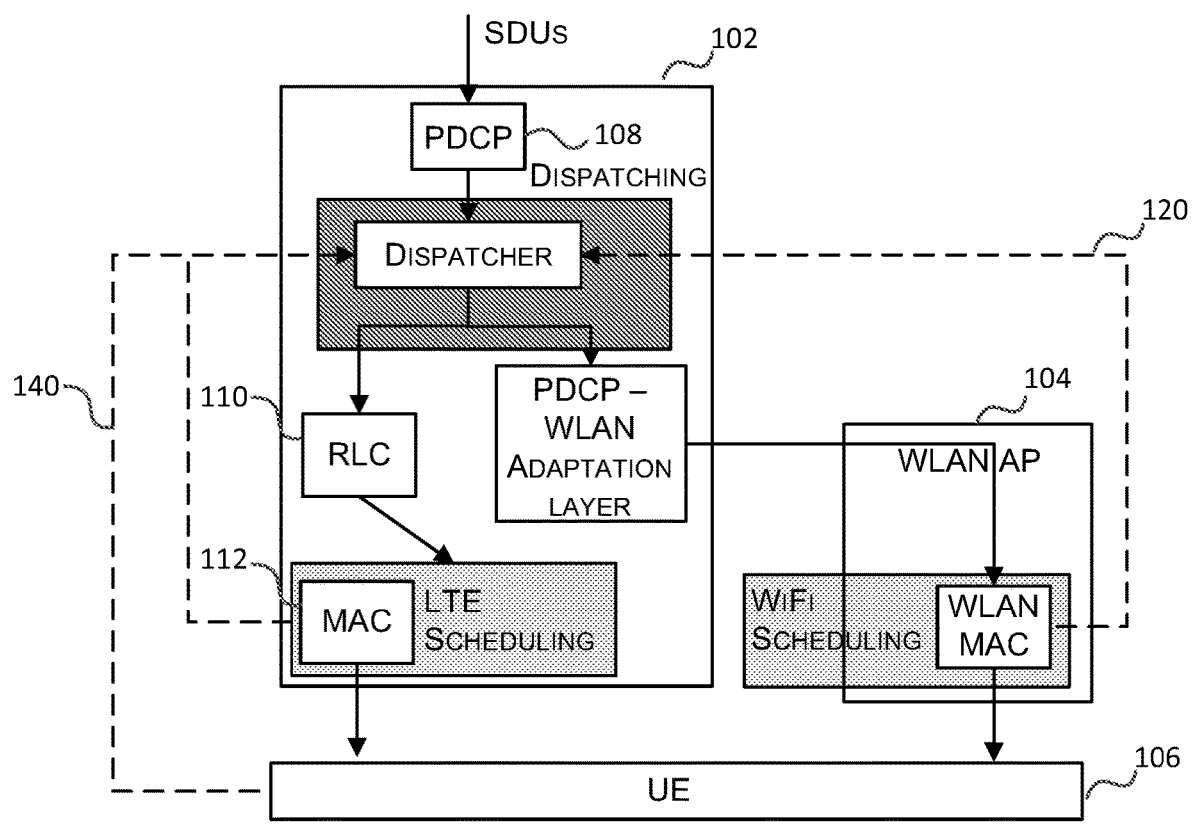
FIG. 1b is a schematic diagram showing a bearer split mechanism for offloading between LTE radio access and WLAN radio access.

Referring to FIG. 1b, with the LWA, a PDCP entity 108 receives PDCP SDUs and assigns a PDCP SDU sequence number to each of the SDUs to generate a corresponding downlink PDCP Packet Data Unit (PDU). Therefore, each PDCP SDU is converted into a PDCP PDU with a corresponding PDCP sequence number (the same as the PDCP SDU sequence number). The eNodeB 102 then sends the generated PDUs to the UE 106 via an LTE Radio Link Control (RLC) entity 110 and a Medium Access Control (MAC) protocol entity 112 and/or a WLAN Access Point (AP) 104. After reception of a PDU, the UE 106 decodes the sequence number of the PDU and stores it for further use in the Status Report. After extracting the SDU from the PDU, the UE forwards the SDU to IP application and discards the PDU.

In telecommunications, bearer service allows transmission of data between network interfaces. When it comes to IP data bearer offloading between LTE and WLAN radio, two options exist for the eNodeB 102:

1) the switch bearer where the offloading is performed per bearer, i.e. all the PDCP PDUs are transmitted from the eNodeB 102 to the UE 106 either via the WLAN AP 104 as shown in FIG. 1a or via the LTE radio access network, 2) the split bearer where the offloading is performed per PDCP PDU, i.e. some PDCP PDUs are transmitted from the eNodeB 102 to the UE 106 via the WLAN AP 104 whereas others are transmitted via LTE radio access, as shown in FIG. 1b. The eNodeB can switch the bearer (for all its data flows or part of them) traffic back and forth between the WLAN and LTE radio access, depending on WLAN radio conditions reported from the UE or those reported from the WLAN AP 104.

The eNodeB 102 may use either of the above offloading options. Choice between the options may depend on load situations and/or signal quality of the LTE radio access and/or the WLAN radio access.

A flow control feedback mechanism may be provided for a data bearer using WLAN in a downlink. The feedback mechanism may allow the WLAN AP to notify the eNodeB 102 of the PDUs that the WLAN AP 104 has received from the eNodeB 102. This allows the eNodeB to identify the PDUs that have been sent to but failed to be received by the WLAN AP 104, and to resend the fail-to-be-received PDUs to the WLAN AP 104, thereby controlling the downlink user data flow via the WLAN AP. The PDCP protocol requires that less than half of the PDCP sequence number space is used by PDUs that have already been sent but not yet acknowledged. This restriction is a legacy LTE PDCP behaviour in order to avoid deciphering issues based on the PDCP sequence number. The feedback from the WLAN AP to the eNodeB is performed according to the GPRS Tunnelling Protocol as per 3GPP TS 29.060 (section 6.1.1 PDCP PDU Number), which sets out the provision of the PDCP sequence number of the not yet acknowledged Network PDUs sent between the WLAN AP and the eNodeB.

In some deployment for the non-collocated scenario e.g. legacy WLAN support, such the WLAN AP feedback to the eNodeB shown as 120 in FIGS. 1a and 1b, is not implemented, thus no flow control mechanism for the downlink user data exists.

For the bearer switch case shown in FIG. 1a, feedbacks 140 from the UE 106 to the eNodeB 102 are preferable at least for the legacy WLAN support where the WLAN AP feedback to the eNodeB is not implemented. Even when the WLAN AP feedback 120 to the eNodeB is available, when WLAN radio conditions are not desirable, due to high latency of the non-ideal backhaul, the WLAN AP feedback 120 to the eNodeB may be delayed and may not provide prompt feedback to the eNodeB on the failure to receive intended PDUs. Thus, feedbacks from the UE to the eNodeB can be useful in providing accurate and prompt feedbacks on failure for the UE to receive intended PDUs.

The RAN has to be aware of the reception status of those PDCP PDUs transmitted via the WLAN radio access in order to ascertain which of the PDUs are not received by the UE. The eNodeB 102 may retransmit the PDCP PDUs, which are failed to be received via Wi-Fi by the UE 106, via the LTE radio access.

ETSI meeting document R2-152141 from MediaTeK proposes periodic PDCP reception status reporting.

Various embodiments of the invention relate to a system in which an eNodeB is configured to transmit data to and receive data from a UE using either LTE or Wi-Fi radio access by off-loading data transmission to a Wi-Fi AP, and a UE is configured to implement the LTE WLAN aggregation and to operate with both LTE and Wi-Fi radio access. The embodiments also relate to a method for reporting a reception status of data received by the UE or the WLAN AP to the eNodeB when the data is transmitted via a radio access other than LTE e.g. the Wi-Fi radio access.

Embodiments of the present invention provide event-triggered methods for a UE or a WLAN AP to provide feedback on status of received PDCP PDUs. Upon occurrence of a pre-defined event, the UE shall report a status of receipt of PDUs, to another entity, e.g., the eNodeB. The status of receipt of PDUs may include information indicating the PDUs the UE has received or information indicating the PDUs that have been transmitted to the UE but failed to be received by the UE.

The event triggered network configuration based PDCP reception status reporting provided to the LTE radio network can be used to control offloading between the LTE and non-LTE radio access networks.

In one example, such an event is receipt of a request that a current PDCP reception status shall be reported. Such a request may be from the eNodeB or any other entities capable of making this request.

In other examples, such an event is based on an analysis of some of the PDCP PDUs that have been received by the UE. In one example, such an event is that the number of PDCP PDUs missing during transmission, i.e. the PDCP PDUs that have been sent to, but have failed to be received by the UE, has reached a threshold value. In this example, when the number of missing PDCP PDUs is above the threshold value, the current PDCP reception status shall be reported.

In another example, such an event is based on a metric with a threshold upon which the current PDCP reception status shall be reported. Such a metric may be a ratio of missing PDCP PDUs to the total number of PDUs that the UE expects or a throughput of PDCP PDUs. The throughput is the rate of successful PDCP PDUs delivery to the total PDUs transmitted over a communication channel. Such a metric can be instantaneous or averaged. For instance, if more than X % of PDCP PDUs are missing or the throughput of PDCP PDUs is below Y %, then the current PDCP reception status shall be reported. If less than X % of PDCP PDUs are missing or the throughput of PDCP PDUs is above Y %, then the current PDCP reception status shall not be reported.

The UE may deduce what PDUs are missing from the ones it has received. For example, if the UE has received PDUs with PDCP sequence numbers 1, 3 and 5-10. From the sequence numbers of the received PDUs, the UE may deduce that at least PDUs with sequence numbers 2 and 4 are missing. The UE may then include these missing sequence numbers in the PDCP status report.

The event-triggered feedback method(s) may be initiated by the Radio Access Network (RAN), allowing more control from the RAN. The RAN may instruct the UE or the WLAN AP to implement the method(s).

The event-triggered feedback method(s) may also be initiated by the UE. The event may be based on information available to the UE e.g. the information relating to a quality of user experience available at the UE.

Figure 2:
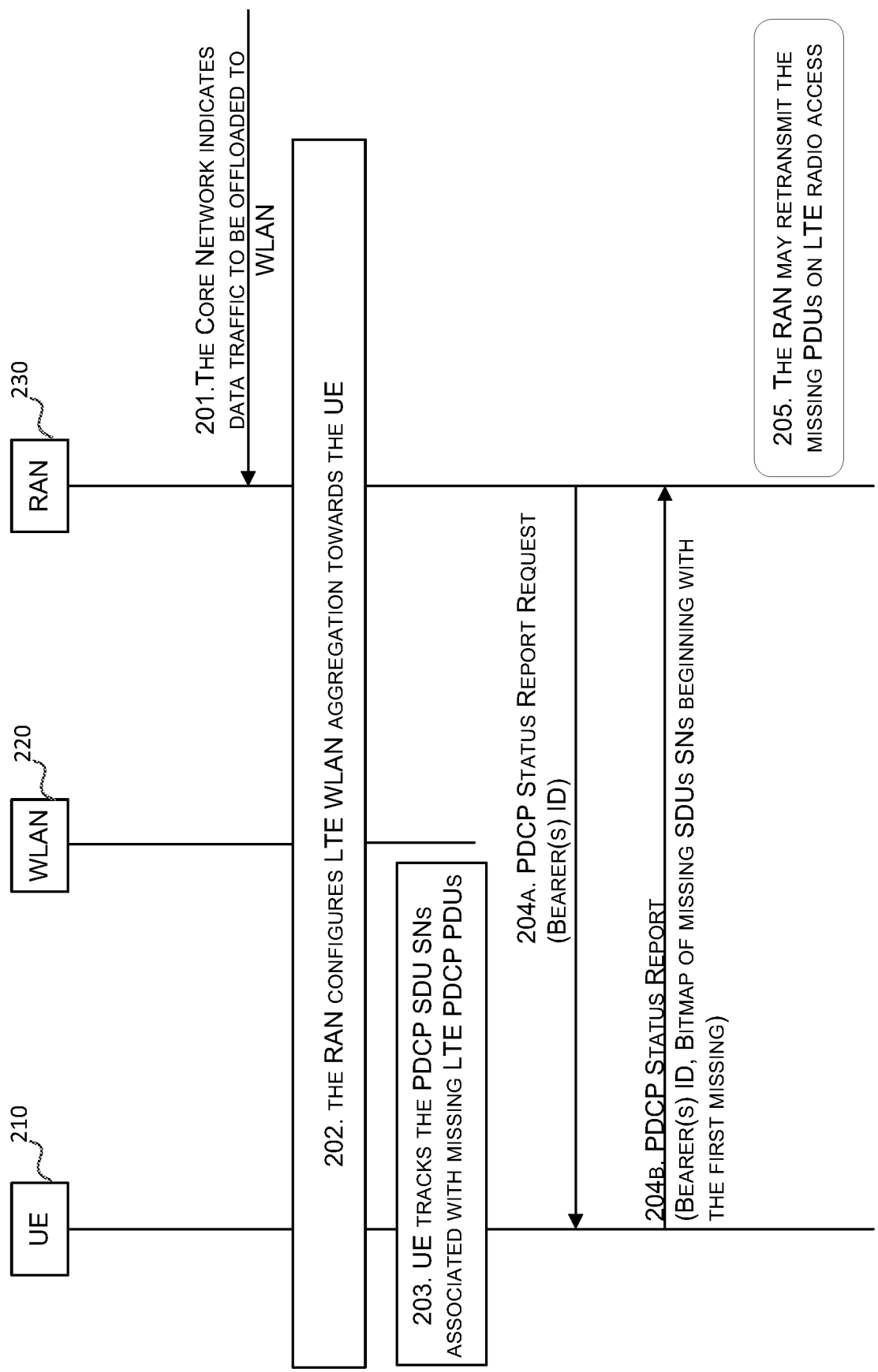
FIG. 2 is a signal flow diagram illustrating a method for reporting PDCP PDU reception status according to a first embodiment of the present invention.

FIG. 2 is a signal flow diagram according to a first embodiment. It illustrates a method for reporting PDCP PDU reception status triggered by a request. Such a method may be implemented in the system of FIG. 1a or 1b. A UE 106, 210 may report the reception status on receiving a request from the eNodeB 102, 230.

In step 201, the LTE RAN 230 is informed by the Core Network of data traffic that can be offloaded towards WLAN. The Core Network may provide parameters such as a type of traffic, bearer id(s), etc. which are used to indicate to offload specific type(s) of data traffic towards one or more particular WLAN APs.

In step 202, on being informed that some data traffic can be offloaded towards a specific WLAN AP 220, the RAN 230 configures its LTE WLAN aggregation functionality (which may be in the form of a Bearer Switch as shown in Figure 1a or a Bearer Split as shown in FIG. 1b) so that it offloads the data traffic towards the WLAN AP 220. The RAN 230 may perform the configuration depending on UE WLAN measurements reports, which may indicate a signal quality between the UE 210 and WLAN AP 220. Then, the LTE RAN 230 offloads the LTE PDCP PDUs to the WLAN 220 access for sending to the UE 210.

In step 203, once the LWA functionality for some bearer (s) has been activated in the UE 210, the UE keeps track of the PDCP PDUs reception status. The reception status may include information, such as the PDCP sequence numbers associated with the PDCP PDUs, for indicating which PDCP PDUs have been received by the UE 210 and may also include information indicating missing PDCP PDUs, which are the PDCP PDUs that have been sent to the UE, but have failed to be received by the UE. The UE may deduce the missing PDUs based on their sequence numbers as explained above.

In steps 204a and 204b, at any time from the activation of the LWA functionally at the UE 210, the RAN can request a PDCP Status Report from the UE. Then the UE may send the PDCP status report including the Sequence Numbers of the received PDUs and/or the missing PDCP PDUs to the RAN.

In step 205, the RAN may retransmit the missing PDUs via the LTE radio access to the UE.

Figure 3:
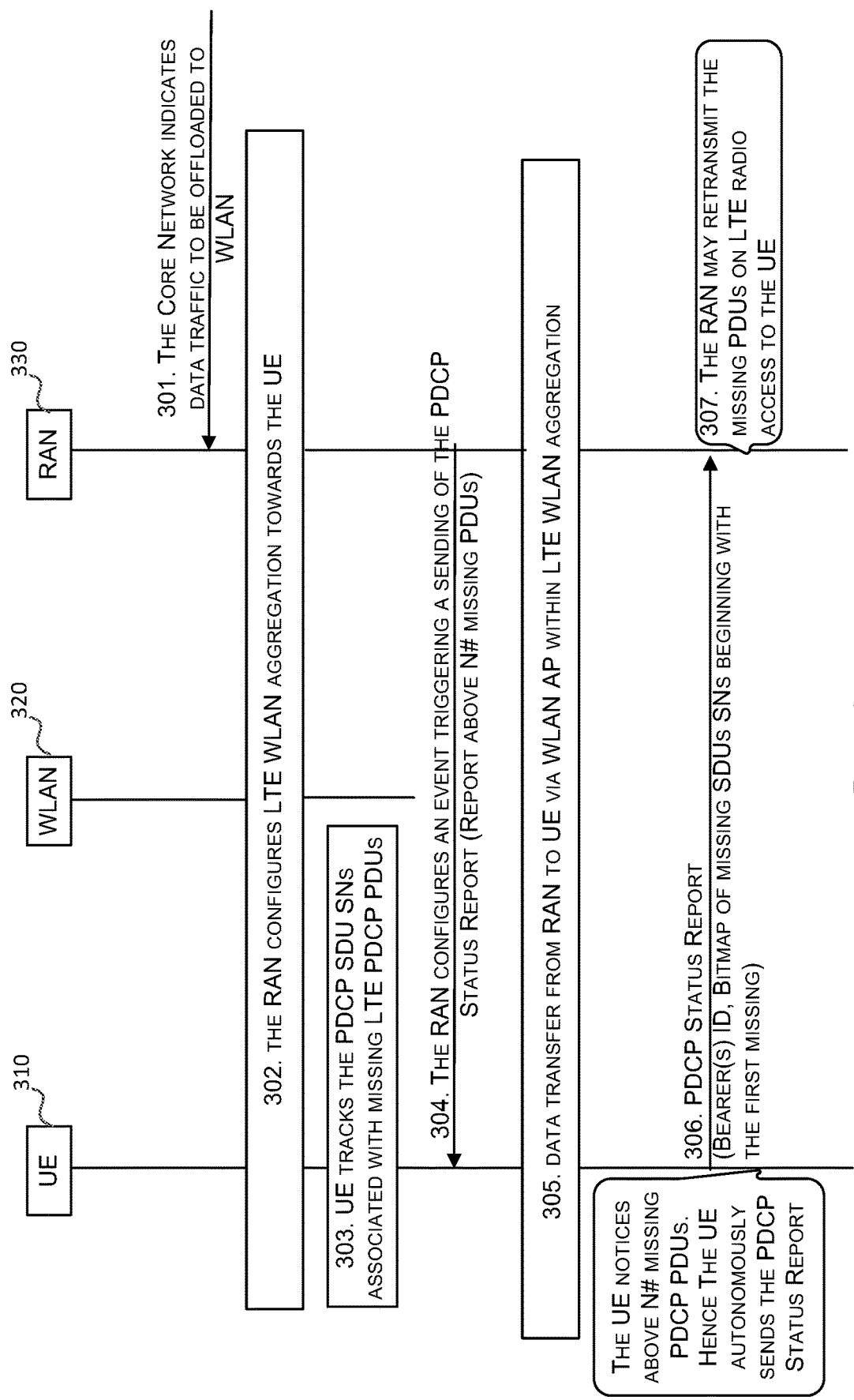
FIG. 3 is a signal flow diagram illustrating a method for reporting PDCP PDU reception status according to a second embodiment of the present invention.

FIG. 3 is a signal flow diagram illustrating a method for reporting PDCP PDU reception status according to a second embodiment of the present invention. In this embodiment, a number of missing PDCP PDUs reaching a threshold triggers reporting of the PDCP reception status.

Steps 301 to 303 are substantially the same as steps 201-203 described with reference to FIG. 2.

In step 304, the RAN may configure the UE to send a PDCP Status Report to the RAN when a triggering event occurs. The RAN may configure the UE 330 to report a status of PDCP PDU reception in the form of PDCP Status Report at the UE to the RAN 330 when the number of missing PDUs deduced by the UE 310 is above a pre-defined threshold value.

In step 305, during receipt of PDCP PDUs at the UE, the UE may deduce PDCP PDU which are missing and count them. It may deduce the number of missing PDCP PDUs from their associated PDCP SDU sequence numbers as explained above. It may also keep a record of the sequence numbers of the missing PDCP PDUs.

In step 306, when the number of the missing PDCP PDUs is above a pre-defined threshold, the UE 310 sends the PDCP status report including the sequence numbers of missing PDCP PDUs to the RAN 330.

In response, in step 307 the RAN may retransmit the missing PDUs to the UE via the LTE radio access network or the Wi-Fi AP. If only the sequence numbers of the received PDUs are provided by the UE to the RAN, the RAN may deduce the sequence numbers of the missing PDUs based on a comparison of the received PDUs and a record of the PDUs that have been transmitted to the UE.

After step 307, the method may return to step 305. Steps 305-307 may then repeat an arbitrary number of times.

Figure 4:
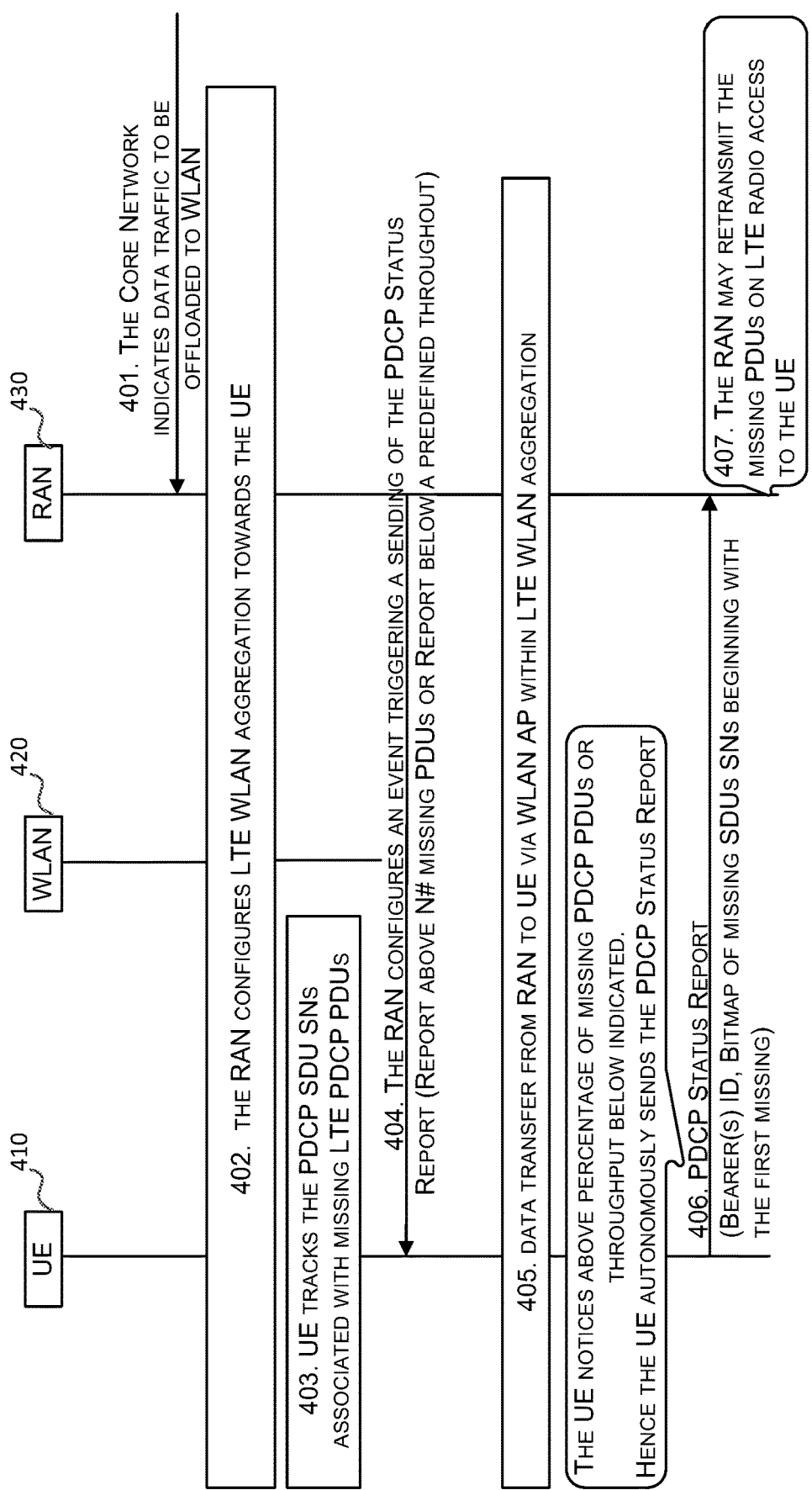
FIG. 4 is a signal flow diagram illustrating a method for reporting PDCP PDU reception status according to a third embodiment of the present invention.

FIG. 4 is a signal flow diagram illustrating a method for reporting PDCP PDU reception status according to a third embodiment of the present invention. In this embodiment, reporting of the PDCP reception status is triggered by a metric reaching a threshold, such a metric may be based on a ratio of the received PDCP PDUs and/or the missing PDUs to the total number of PDUs expected by the UE.

Steps 401 to 403 are substantially the same as steps 201-203 described with reference to FIG. 2 and steps 301-303 described with reference to FIG. 3.

In step 404, the RAN may configure the UE to send a PDCP Status Report to the RAN when a triggering event occurs. The RAN may configure the UE to report the PDCP Status for a particular Wi-Fi AP, when a percentage/ratio of missing PDUs to the total number of PDUs expected by the UE is above a threshold or a throughput of PDUs is below a threshold for data received from the Wi-Fi AP. The total number of PDUs expected may be deduced by the UE from the first and the last sequence numbers in the received PDUs or the UE may be informed of the number by the RAN.

In step 405, data is transmitted to the UE from the RAN 420 via the WLAN AP 420 during data transfer to the UE, the UE tracks received and/or missing PDUs. The UE may also deduce a ratio of the number of missing PDCP PDUs to the total number of expected PDUs. The UE may also deduce a throughput of the PDUs based on the number of received PDUs and the number of expected PDUs. It may also keep a record of Sequence Numbers of the received and/or missing PDCP PDUs.

In step 406, when the calculated ratio is above a pre-defined threshold or the calculated throughput is below a pre-defined threshold, the UE sends the PDCP status report, preferably including the sequence numbers of the received and/or the missing PDCP PDUs, to the RAN.

In step 407, the RAN may retransmit the missing PDUs on the LTE radio access network. If only the sequence numbers of the received PDUs are provided by the UE to the RAN, the RAN may deduce the sequence numbers of the missing PDUs based on a comparison of the received PDUs and the a record of the PDUs that have been transmitted to the UE.

After step 407, the method may return to step 405, where the UE may track a percentage of missing PDCP PDUs or the throughput for subsequent data transfer. Steps 405-407 may then repeat an arbitrary number of times.

Embodiments of the present invention provide technical advantages over current technologies. Based on the feedback from a UE on receipt of PDCP PDUs via Wi-Fi radio access, a RAN operator would be informed of the transmission conditions of the Wi-Fi radio access, and can, depending on the transmission conditions of the Wi-Fi radio access, balance and optimize radio resource utilization between LTE and WLAN radio accesses available to the RAN. Based on the feedback, the RAN may make a decision on the amount of traffic to be offloaded to the WLAN AP. For example, if a ratio for the missing PDCP PDUs sent via WLAN is above a threshold, or when the throughput via WLAN is below a threshold value, the RAN may decide to reduce the amount of traffic to be offloaded to the WLAN AP, as the quality of transmission via the WLAN AP is not at a desirable level.

Although the embodiments are described in a way that the UE 210, 310, 410 may be configured to provide feedback in the form of a PDCP status report to the eNodeB, it will be appreciated that the methods may also apply to the downlink transmission between the eNodeB and the WLAN AP 220, 320, 420. That is to say, the WLAN AP 220, 320, 420 may provide the PDCP status report to the eNodeB in a way that the UE 210, 310, 410 is described to provide.

Those skilled in the art will appreciate that methods according to the embodiments may be carried out by software computer programs, hardware, or a combination of software and hardware.

These methods are provided by way of example only. The disclosure of this application is not restricted by the specific combination of steps shown in the figures, and described herein, but includes any appropriate subsets or combinations of steps performed in any appropriate order. Sections of the method may be performed in parallel.

The term 'user equipment' (UE) is used herein to refer to any device with processing and telecommunication capability such that it can perform the methods according to the embodiments of the present invention. Those skilled in the art will realize that such processing and telecommunication capabilities can be incorporated into many different devices and therefore the term 'user equipment' includes mobile telephones, personal digital assistants, PCs and many other devices.

Although in the embodiments and examples described above, only LTE and Wi-Fi are described as exemplary radio access technologies, it will be appreciated that the method of the embodiments of the present invention apply to any other radio access technologies without losing the effect sought.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A method performed by a User Equipment having a first wireless interface for establishing a communication link with an eNodeB of an LTE Radio Access Network, and a second wireless interface for establishing a communication link with a Wi-Fi Access Point, the method comprising:
receiving, by the User Equipment, Packet Data Units, PDUs, encoded using a Packet Data Convergence Protocol, PDCP, via the first or second wireless interface;
deriving, by the User Equipment, PDCP sequence numbers from successfully received PDCP PDUs;
from the derived PDCP sequence numbers deriving, by the User Equipment, missing PDCP sequence numbers and a number of missing PDCP sequence numbers; and
sending to the eNodeB, by the User Equipment in response to a request for an LTE WLAN Aggregation, LWA, PDCP status report by the eNodeB, an LWA PDCP Status Report derived at least in part from the sequence numbers of the successfully received PDCP PDUs and including the number of missing PDCP sequence numbers.

2. The method of claim 1, wherein said PDCP Status Report comprises the PDCP sequence numbers associated with the successfully received PDCP PDUs.

3. The method of claim 1,
wherein said deriving PDCP sequence numbers comprises deriving the PDCP sequence numbers corresponding to PDCP PDUs which are missing from the PDCP PDUs successfully received by the UE;
wherein said PDCP Status Report comprises the PDCP sequence numbers corresponding to the PDCP PDUs which are missing from the PDCP PDUs successfully received by the UE.

4. The method of claim 1, further comprising determining, by the UE, a ratio of the number of PDCP sequence numbers which are missing to a total number of PDCP PDUs expected by the UE.

5. The method of claim 1, wherein further comprising determining by the UE, a throughput of the PDCP PDUs, which is a ratio of a number of successfully received PDCP PDUs to a total number of PDCP PDUs expected by the UE.

6. The method of claim 1, wherein the request is based on said number of the PDCP sequence numbers which are missing exceeding a pre-defined threshold.

7. The method of claim 4, wherein the request is based on said ratio exceeding a pre-defined threshold.

8. The method of claim 1, wherein the request is based on a throughput falling below a pre-defined threshold.

9. The method of claim 1, further comprising
receiving, by the eNodeB from the UE, the PDCP status report;
deducing, by the eNodeB from the PDCP status report, the PDCP PDUs which have been transmitted to the UE but have failed to be received by the UE, and
re-transmitting, by the eNodeB to the UE, the PDCP PDUs that have failed to be received by the UE.

10. The method of claim 1, further comprising offloading, by the eNodeB, to the Wi-Fi Access Point, data to be sent to the UE.

11. The method of claim 10, further comprising determining, by a LTE network, an amount of data traffic to be offloaded to the Wi-Fi Access Point based on the PDCP Status Report.

12. A User Equipment, wherein the User Equipment is configured for performing the method of claim 1.

13. A method for use by a Wi-Fi Access Point having a wireless interface for establishing a communication link with an eNodeB of an LTE Radio Access Network, the method comprising the steps of:
- receiving, by the Wi-Fi Access Point, Packet Data Units, PDUs, encoded using a Packet Data Convergence Protocol, PDCP, via the wireless interface;
- deriving, by the Wi-Fi Access Point, PDCP sequence numbers from successfully received PDCP PDUs; and
- sending, by the Wi-Fi Access Point to the eNodeB in response to a request for an LTE WLAN Aggregation, LWA, PDCP status report by the eNodeB, an LWA PDCP Status Report derived at least in part from the sequence numbers of the successfully received PDCP PDUs and including a number of missing PDCP sequence numbers.

14. The method of claim 13, wherein said PDCP Status Report comprises the PDCP sequence numbers missing from the derived sequence numbers of the successfully received PDCP PDUs.

15. The method of claim 1, wherein the User Equipment is configured for performing the method of claim 1, wherein each PDCP PDUs corresponds to a PDCP SDU and an associated PDCP SDU sequence number.

* * * * *